United States Patent [19]

Brown

[11] Patent Number: 4,575,669
[45] Date of Patent: Mar. 11, 1986

[54] BATTERY EQUALIZER CIRCUIT

[75] Inventor: Harry B. Brown, Falls Church, Va.

[73] Assignee: Applied Electro Mechanics, Inc., Alexandria, Va.

[21] Appl. No.: 645,216

[22] Filed: Aug. 29, 1984

[51] Int. Cl.⁴ .............................................. H02J 7/00
[52] U.S. Cl. ...................................... 320/13; 320/14; 320/29; 320/39
[58] Field of Search ................... 320/2, 13, 14, 29, 39, 320/40

[56] References Cited

U.S. PATENT DOCUMENTS 4,302,714 11/1981 Yefsky ................................. 320/39
4,342,953 8/1982 Collins ................................. 320/13

Primary Examiner—Patrick R. Salce
Assistant Examiner—Anita M. Ault
Attorney, Agent, or Firm—Littlepage & Webner

[57] ABSTRACT

A discharge circuit reduces the state of charge of a battery to a nominal zero so that the battery can be put through one or more complete charge/discharge cycles.

1 Claim, 1 Drawing Figure

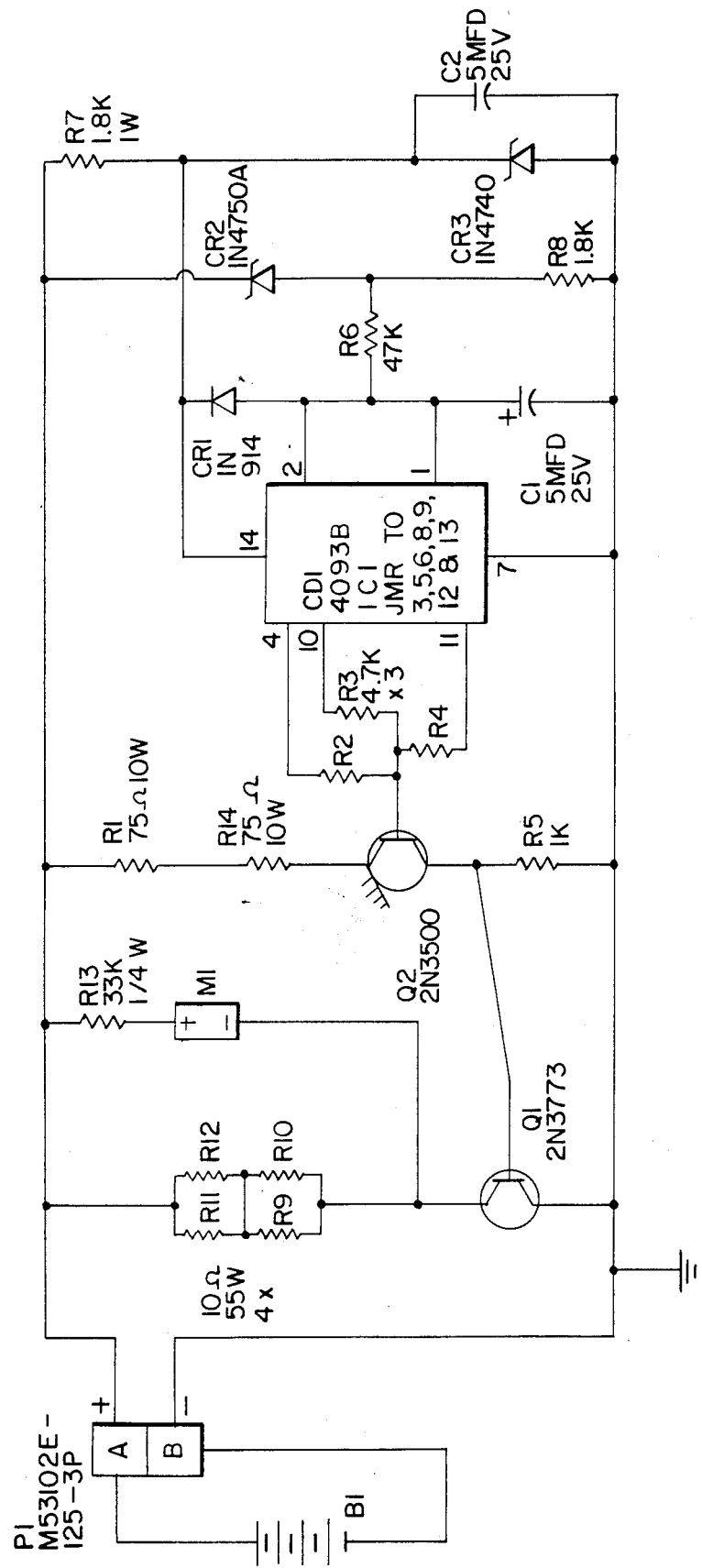

BATTERY EQUALIZER CIRCUIT

FIELD OF INVENTION

Transistor circuits which have specific uses as battery chargers, Digest 1 in Class 320, Electricity, Battery and Condensor Charging and Discharging.

OBJECTS

The proper charging of many battery types and specifically nickle cadmium type, is simplified by knowing in advance the state of charge of the battery. By reducing the state of charge to nominal zero, the charging operation can then be administered with complete confidence, as the manufacturers instructions will invariably detail the proper method for restoring the battery to full capacity.

Briefly stated, reducing the state of charge to nominal zero is accomplished by discharging the battery until its voltage drops to a predetermined value. This voltage, which indicates an "empty" battery, is also clearly stated in the manufacturers instructions. For example, a nickle cadmium (Ni-Cad) cell is commonly considered empty when its voltage reaches 1.1 volt. A twenty cell Ni-Cad battery is therefore at a nominal zero state of charge when its voltage in operation reaches 22 volts.

The object of this invention is to reduce a battery, consisting of 30 Ni-Cad cells in series connection, to a nominal zero state of charge. The nominal terminal voltage of this battery is 36 volts. In operation, when this voltage drops to 33 volts, its usefulness is ended and further attempt to draw on its power will find the voltage dropping rapidly.

These and other objects will be apparent from the drawing in which the sole FIGURE is a circuit diagram of the battery equalizer circuit.

Referring now to the drawing, the discharge current flows from the battery, B1, thru the cable connector, P1 terminal A, thru 4 resistors, R9, R10, R11, R12, thru transistor, Q1, back to the battery, B1, thru terminal B of P1. Transistor, Q1, can therefore permit the discharge to continue or stop depending on the bias voltage applied to its base terminal. This is set by the current flow thru resistor R5.

The current thru R5 is, in turn, controlled by the transistor Q2 which also draws some battery current thru R1 and R14, and essentially the same current thru R5. The conduction of this current thru Q2 is dependent on the bias voltage applied to its base to emitter junction which in this case must overcome the bias applied to Q1 as well.

Referring to the right hand components of the circuit, the three components R7, C2, and CR3 form a regulated voltage supply of roughly 10 volts (across C2 and CR3). Regulated means it is independent of the battery voltage applied to the terminals A and B of receptacle P1. The 10 volts is set by the electrical character of the zener diode CR3 and is a convenient value for the operation of the integrated circuit, IC-1.

IC-1 is a Schmitt-Trigger. Its action is characterized by restricting the output terminals such that they can only be hi (10 volts) or low (0 volts). As interconnected in this circuit, IC-1 has three outputs on terminals 4, 10, and 11. These three outputs, connected to the base terminal of Q2 by resistors R2, R3, R4 completely determine the bias on base-emitter of Q2 causing it to conduct current thru R5 or blocking that current flow when no forward bias is applied, namely, when voltages on IC-1 terminals 4, 10, 11, are zero.

The three output terminal voltages are in the hi or low state (10 or 1 volts) due to the application of voltages on input terminals 1 and 2 of IC-1. As terminals 1 and 2 are wired together, the same voltage is applied to both. This input voltage results from an action generated by the two component parts, CR2 and resistor R8.

A convenient way of understanding the action CR2 and R8 is to notice (1) that they are series connected across the terminals A and B of P1 and therefore are across the battery terminals, (2) the voltage across R8 plus the voltage across CR2 therefore equals the battery voltage. As CR2 is a zener diode, the voltage across it is essentially constant. It is critical to the circuit then, that as the battery changes, its voltage variation is reflected, volt for volt, in the voltage across R8. This maximum variation can then be used to provide a like voltage variation on IC-1 terminals 1 and 2 applied thru R6. Specifically, this "off-on" voltage applied to terminals 1 and 2 can be tailored by zener diode selection of CR2 to turn on and off the discharge circuit of Q1.

In the case of the subject circuit, the discharge action will start whenever the battery voltage equals or exceeds 34 volts and will cease to discharge the battery when its terminal voltage falls to 30 to 33 volts. The functions of C1 and CR1 may be noted. CR1 is a small diode that prevents the terminal voltage on pins 1 and 2 from greatly exceeding the 10 volts on terminal 14. Otherwise such excessive voltage might damage the IC. C1, a capacitor, in conjunction with R6, slows the off-on action of the circuit sightly. When the discharge action stops, the battery voltage begins to creep up. The action of C1 and R6 is to delay both the switching to off and switching to on which results.

In operation, when the starting voltage of the battery is 34 volts or more, the voltage sensed at pins 1 and 2 of IC-1, as compared to the voltage sensed at pin 14 exceeds a predetermined level. The circuit will draw current and continue to do so until the battery voltage drops to from 33 volts to 30 volts. This cycle will continue until the battery voltage stabilizes at from 33 to 30 volts.

To obtain the full ampere hour rating of the new Ni-Cad batteries, several charge/discharge cycles may be required to obtain full charge storage capacity.

To recondition batteries with low capacity, resulting from variable field service, the charge/discharge cycle is required to return the battery to full capacity. This automatic repeating voltage control establishes the low voltage state of charge condition with an accuracy not obtainable by manual discharge, as Ni.-Cd. voltages creep and require continuous monitoring and discharge to obtain the starting discharge voltage.

I claim:

1. A battery equalizer circuit for preparing a battery for charge, comprising
   a battery discharge circuit including resistor means and switch means in series therewith for connection across the terminals of a battery to draw current therefrom when the switch means is closed,
   control circuit means for opening and closing such switch means,
   voltage sensing means for sensing the voltage across the battery terminals,
   and means actuatable by said sensing means for actuating said control circuit means whereby to close said switch means when the sensed battery voltage is equal to or more than a predetermined upper voltage and for opening said switch means when the sensed battery voltage is in a lower range which is equal to or less than a predetermined voltage which is lower than said upper voltage, said switch means comprising a transistor having its emitter-collector terminals in series with said resistor means and a base, said means actuable by the sensing means comprising a Schmitt-Trigger having output terminals operably connected to said transistor base, said voltage sensing means being connected to one imput circuit means of the Schmitt-Trigger, regulated power supply means for establishing a reference voltage which is substantially lower than said lower range of voltage and which is connected to another input terminal of the Scmitt-Trigger whereby the latter is flipped "on" and said transistor is thereby rendered conductive when the sensed voltage exceeds the reference voltage by a predetermined amount.

* * * * *

UNITED STATES PATENT AND TRADEMARK OFFICE
CERTIFICATE OF CORRECTION

PATENT NO. : 4,575,669
DATED : March 11, 1986
INVENTOR(S) : Harry B. Brown

It is certified that error appears in the above-identified patent and that said Letters Patent is hereby corrected as shown below:

In Column 2, Line 16, the word --voltage-- should be inserted after the word "battery".

Signed and Sealed this

Fifteenth Day of September, 1987

*Attest:*

DONALD J. QUIGG

*Attesting Officer*   *Commissioner of Patents and Trademarks*